United States Patent [19]

Miller et al.

[11] 4,452,633
[45] Jun. 5, 1984

[54] METHOD FOR PRODUCING COBALT METAL POWDER

[75] Inventors: Michael J. Miller; Richard A. Scheithauer; Clarence D. Vanderpool, all of Towanda; Eric F. Husted, Ulster, all of Pa.

[73] Assignee: GTE Products Corporation, Stamford, Conn.

[21] Appl. No.: 547,181

[22] Filed: Oct. 31, 1983

[51] Int. Cl.³ ............................................. B22F 9/20
[52] U.S. Cl. ............................... 75/0.5 A; 75/0.5 AA; 75/103; 75/109; 75/118 R; 75/119; 423/32
[58] Field of Search ............... 75/0.5 A, 0.5 AA, 103, 75/109, 118 R, 119; 423/32

[56] References Cited

U.S. PATENT DOCUMENTS

| | | | |
|---|---|---|---|
| 4,214,894 | 7/1980 | Ritsko et al. | 75/0.5 AA |
| 4,214,895 | 7/1980 | Gingerich et al. | 75/119 |
| 4,214,896 | 7/1980 | Cheresnowsky | 75/119 |
| 4,218,240 | 8/1980 | Gingerich et al. | 75/0.5 AA |
| 4,278,463 | 7/1981 | Vanderpool et al. | 75/0.5 A |
| 4,348,224 | 9/1982 | Gingerich et al. | 75/0.5 AA |
| 4,381,937 | 5/1983 | Gingerich et al. | 75/0.5 AA |

*Primary Examiner*—W. Stallard
*Attorney, Agent, or Firm*—Robert E. Walter

[57] ABSTRACT

In a process for producing fine size cobalt metal powder from scrap material containing brazing compositions, the silver ions are removed by cementation with iron to form an insoluble mixture which is subsequently treated with concentrated hydrochloric acid to solubilize the silver which is then precipitated as silver chloride.

1 Claim, No Drawings

METHOD FOR PRODUCING COBALT METAL POWDER

TEHNICAL FIELD

This invention relates to an improved process for producing cobalt metal powder from scrap material of the type including cobalt and silver or copper.

BACKGROUND

U.S. Pat. No. 4,218,240 to Gingerich, et al. relates to a process wherein cobalt is recovered by treating aqueous solutions containing ammonia and cobalt ions with sufficient amount of an acid in the presence of a catalyst to convert the cobalt ions to a cobalt hexamine ion which is precipitated and separated from the resulting solution. The precipitate is dissolved in an aqueous solution to form a relatively pure solution which is treated with a metallic hydroxide to form a cobalt containing precipitate which is reduced to form fine particles of cobalt.

According to the above basic process, some copper may be removed during the normal purification steps during filtration of the aqueous cobaltic hexammine solution. If small amounts of ammonium chloride and ammonium hydroxide are present in the aqueous hexammine cobalt chloride solution, some of the copper remains dissolved and contaminates the cobalt hexammine precipitate.

Typically the scrap material contains significant quantities of copper and silver which are commonly used in brazing alloys. In this case, the normal purification step may be achieved with difficulty due to the presence of large quantities of solids.

U.S. Pat. No. 4,348,224 overcomes this problem by providing a process for producing fine particle size cobalt metal powder from scrap material comprising cobalt and copper or silver, said process comprising digesting said scrap material is aqueous hydrohlcoric acid to produce an aqueous acid cobalt chloride solution containing copper ions or silver ions, contacting said aqueous acid cobalt chloride solution at a pH of from about 2 to about 4 with a sufficient amount of iron metal to cement said copper or silver with said iron to form an insoluble mixture and a resulting aqueous acid cobalt chloride solution, complexing cobalt present in said aqueous acid cobalt chloride solution with ammonia to form a cobalt ammine chloride solution, forming a cobalt containing precipitate, and reducing said cobalt containing precipitate to form a cobalt metal powder.

By the improvement described in U.S. Pat. No. 4,348,224, both copper and silver which are typically present in brazes can be desirably removed with a single treatment without adversely effecting the cobalt concentration or adding additional contaminates to the process stream which will require subsequent removal.

SUMMARY OF THE INVENTION

U.S. Pat. No. 4,218,240 to Gingerich et al. and U.S. Pat. No. 4,348,224 to Gingerich et al. are both incorporated by reference into the present application.

The present invention is an improvement of the process described in the above patents since silver values are recovered from the processes as described in the above patents.

In accordance with the present invention there is provided a process recovering silver values and producing fine particle size cobalt metal powder from scrap material comprising cobalt and silver, said process comprising digesting said scrap material in aqueous hydrochloric acid to produce an aqueous acid cobalt chloride solution containing silver ions, contacting said aqueous acid cobalt chloride solution at a pH of from about 2 to about 4 with a sufficient amount of iron metal to result in the cementation of said silver ions with said iron to form an insoluble mixture comprising iron and silver and a resulting aqueous acid cobalt chloride solution, separating said insoluble mixture from said resulting aqueous acid cobalt chloride solution, complexing cobalt present in said aqueous cobalt chloride solution with ammonia to form a cobalt ammine chloride solution, forming a coalt containing precipitate, and reducing said cobalt containing precipitate to form a cobalt metal powder, digesting said insoluble mixture comprising iron and silver in concentrated hydrochloric acid to form an aqueous solution containing silver values and a solid residue, separating said aqueous solution containing silver values from said solid residue, and diluting said aqueous solution containing silver values with water to form a silver chloride precipitate, and separating said silver chloride precipitate to recover said silver values.

DETAILED DESCRIPTION

As per column 2, lines 40 to 57, of U.S. Pat. No. 4,348,224 which is incorporated by reference into the present application, iron acts as a scavenger in that copper and silver in solution plates or combines with solid iron particles. This precipitate of iron and copper or silver is called an insoluble mixture for purposes of the present invention.

According to the present invention, the insoluble residue is separated from the resulting aqueous acid cobalt chloride solution. The resulting aqueous cobalt chloride solution is processed according to the method described in U.S. Pat. No. 4,218,240 which is also incorporated by reference into the present application to give a fine cobalt metal powder.

According to the improvement of the present invention, the insoluble residue as described above containing silver and iron is processed to recover the silver values.

The insoluble mixture comprising iron and silver is digested in concentrated hydrochloric acid to form an aqueous solution containing silver values and a solid residue. The solid residue comprises materials such as carbon, tungsten silicon, etc. which are insoluble in the hydrochloric acid. The concentration of hydrochloric acid should be sufficient to dissolve substantially all the silver values. Preferably the hydrochloric acid concentration is from about 20 to about 30 parts of hydrogen chloride per 100 parts of water. The solution containing silver values additionally includes iron and copper values and may contain other cations such as nickel, zinc, chromium, and manganese.

After separating the insoluble residue from the solution containing silver values and additional iron and copper values, the solution is diluted by adding water to preferentially precipitate the silver values as silver chloride while substantially all the additional cation metal values remain in solution. The amount of dilution depends on the initial concentration of hydrochloric acid in the solution. If the hydrochloric acid concentration is from about 10.0 molar to about 12.0 molar, the solution should be diluted with from to about 6 parts by weight water per part by weight hydrochloric acid to preferentially form a precipitate consisting essentially of silver chloride.

EXAMPLE

Scrap material containing about 454 parts of rectangular-shaped pieces of cemented carbide having dimensions of less than about one square inch and containing copper and silver in an amount typically present as a braze associated with the carbide is digested under reflux for about seven days with about 717 parts of azeotropic (20.24 percent HCl). At the end of this time, the carbide is in the form of a depleted skeleton with the braze and cobalt in solution. The pH of the resulting aqueous acid solution is adjusted to about 3 and iron metal powder (about 7 grams) is added to the solution. The resulting mixture was stirred for about 3 hours and filtered. The filtrate was depleted in copper and silver values while the solid portion contained silver and copper on the iron particles. The filtrate was then processed according to the process described in Example 1 of U.S. Pat. No. 4,218,240, which is incorporated by reference into the present application. The insoluble mixture containing silver, copper and iron, about 50 grams is treated with about 550 grams of 10.0 normal hydrochloric acid for about 60 minutes at ambient temperatures. The solid residue is separated from the aqueous hydrochloric acid portion which is then diluted by slowly adding 2500 grams of water. The resulting precipitate consists essentially of silver chloride and weighed about 2.0 grams.

We claim:

1. A process recovering silver values and producing fine particle size cobalt metal powder and from scrap material comprising cobalt and silver, said process comprising digesting said scrap material in aqueous hydrochloric acid to produce an aqueous acid cobalt chloride solution containing silver ions, contacting said aqueous acid cobalt chloride solution at a pH of from about 2 to about 4 with a sufficient amount of iron metal to result in the cementation of said silver ions with said iron to form an insoluble mixture comprising iron and silver and a resulting aqueous acid cobalt chloride solution, separating said insoluble mixture from said resulting aqueous acid cobalt chloride solution, complexing cobalt present in said aqueous cobalt chloride solution with ammonia to form a cobalt ammine chloride solution, forming a cobalt containing precipitate, and reducing said cobalt containing precipitate to form a cobalt metal powder, digesting said insoluble mixture comprising iron and silver in concentrated hydrochloric acid to form an aqueous solution containing silver values and a solid residue, separating said aqueous solution containing silver values from said solid residue, and diluting said aqueous solution containing silver values with water to form a silver chloride precipitate, and separating said silver chloride precipitate to recover said silver values.

* * * * *